(12) United States Patent
Onji et al.

(10) Patent No.: US 12,351,085 B2
(45) Date of Patent: Jul. 8, 2025

(54) VEHICLE SEAT

(71) Applicant: DELTA KOGYO CO., LTD., Hiroshima (JP)

(72) Inventors: Atsushi Onji, Hiroshima (JP); Yuki Arita, Hiroshima (JP); Yuki Sato, Hiroshima (JP); Masato Naraki, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 221 days.

(21) Appl. No.: 17/996,268

(22) PCT Filed: Jun. 23, 2021

(86) PCT No.: PCT/JP2021/023696
§ 371 (c)(1),
(2) Date: Oct. 14, 2022

(87) PCT Pub. No.: WO2022/009673
PCT Pub. Date: Jan. 13, 2022

(65) Prior Publication Data
US 2023/0202356 A1 Jun. 29, 2023

(30) Foreign Application Priority Data
Jul. 10, 2020 (JP) ................ 2020-119433

(51) Int. Cl.
 *B60N 2/20* (2006.01)
 *B60N 2/01* (2006.01)
 (Continued)

(52) U.S. Cl.
CPC ............... *B60N 2/20* (2013.01); *B60N 2/012* (2013.01); *B60N 2/22* (2013.01); *B60N 2/30* (2013.01)

(58) Field of Classification Search
CPC .......... B60N 2/012; B60N 2/015; B60N 2/20; B60N 2/22; B60N 2/2227; B60N 2/2255; B60N 2/3009; B60N 2/305; B60N 2/36
(Continued)

(56) References Cited

U.S. PATENT DOCUMENTS

| 4,572,569 | A | * | 2/1986 | Haßmann | B60N 2/36 |
| | | | | | 297/378.13 |
| 4,958,877 | A | * | 9/1990 | Lezotte | B60N 2/015 |
| | | | | | 296/65.17 |

(Continued)

FOREIGN PATENT DOCUMENTS

| CN | 101096186 A | 1/2008 |
| CN | 101293493 A | 10/2008 |

(Continued)

OTHER PUBLICATIONS

International Search Report issued in PCT/JP2021/023696; mailed Aug. 31, 2021.

(Continued)

*Primary Examiner* — Gregory A Blankenship
(74) *Attorney, Agent, or Firm* — Studebaker Brackett PLLC (57) ABSTRACT

A vehicle seat includes a first hinge rotatably supporting a left seatback framework and a second hinge rotatably supporting a center seatback framework. The first hinge includes a first base bracket and a first hinge bracket continuous to the first bracket, and the second hinge includes a second base bracket and a second hinge bracket continuous to the second base bracket. Each of the first hinge and the second hinge has a frame bracket coupled to the corresponding seatback framework and a shaft about which the hinge rotates. An urging member is wound on the shaft. A joining part joins a distal end of the first hinge bracket of the first (Continued)

hinge to a distal end of the second hinge bracket of the second hinge.

4 Claims, 9 Drawing Sheets

(51) Int. Cl.
  *B60N 2/22* (2006.01)
  *B60N 2/30* (2006.01)
(58) Field of Classification Search
  USPC .................................................... 296/65.16
  See application file for complete search history.

(56) References Cited

U.S. PATENT DOCUMENTS

| | | | | |
|---|---|---|---|---|
| 5,685,612 | A * | 11/1997 | MacDonald | B60N 2/366 297/440.1 |
| 8,840,183 | B2 * | 9/2014 | Genta | B60N 2/3013 297/383 |
| 2008/0258529 | A1 * | 10/2008 | Maruno | B60N 2/20 297/257 |
| 2008/0315609 | A1 * | 12/2008 | Maruno | B60N 2/22 296/65.09 |
| 2009/0243325 | A1 | 10/2009 | Villeminey | |
| 2017/0008426 | A1 * | 1/2017 | Stesl | B60N 2/682 |
| 2023/0202356 | A1 * | 6/2023 | Onji | B60N 2/366 296/65.01 |

FOREIGN PATENT DOCUMENTS

| | | |
|---|---|---|
| CN | 101544198 A | 9/2009 |
| DE | 10 2005 029649 A1 | 12/2006 |
| GB | 2567425 A | 4/2019 |
| JP | H01-093144 U | 6/1989 |
| JP | H09-150657 A | 6/1997 |
| JP | 2007-261294 A | 10/2007 |
| JP | 2011-073621 A | 4/2011 |
| JP | 2016-150733 A | 8/2016 |
| JP | 6191373 B2 | 9/2017 |

OTHER PUBLICATIONS

The extended European search report issued by the European Patent Office on Aug. 14, 2023, which corresponds to European Patent Application No. 21836998.1-1012 and is related to U.S. Appl. No. 17/996,268.

An Office Action mailed by China National Intellectual Property Administration on Apr. 28, 2023, which corresponds to Chinese Patent Application No. 202180030703.7 and is related to U.S. Appl. No. 17/996,268.

* cited by examiner

VEHICLE SEAT

TECHNICAL FIELD

The present invention relates to a vehicle seat, and in particular to a hinge structure of a foldable vehicle seat.

BACKGROUND ART

Vehicle seats adoptable for automobiles include a foldable seat having a seatback which is foldable through a manipulation by a user. For instance, each of Patent Literatures 1 and 2 discloses a structure of a foldable seat as a rear seat of an automobile.

Patent Literature 1 discloses a vehicle seat including two seatbacks being adjacent to each other in a vehicle width direction of an automobile. Patent Literature 1 discloses a technology for, even at a collision of a baggage loaded in a trunk or boot located in the rear of the rear seat with the seatback due to sudden deceleration of the automobile, suppressing frontward tilting of the seatback collided with the baggage.

Patent Literature 2 discloses a vehicle seat including three seatbacks aligning in a vehicle width direction of an automobile. The vehicle seat disclosed in Patent Literature 2 is provided with a lock mechanism that restricts a change in a posture of the seatback, which is located at a center in the vehicle width direction in a shiftable manner between a forward tilting posture and an upright posture, so that the seatback is kept in the upright posture. Patent Literature 2 further discloses a technology for, even at a collision of a baggage loaded in a trunk located in the rear of a rear seat with the center seatback due to sudden deceleration of the automobile, suppressing undesired frontward tilting of the center seatback attributed to, for example, deformation of the lock mechanism.

CITATION LIST

Patent Literature

Patent Literature 1: Japanese Patent Publication Number 6191373
Patent Literature 2: Japanese Unexamined Patent Publication No. 2016-150733

SUMMARY OF INVENTION

However, such a foldable vehicle seat including a plurality of seatbacks aligning in the vehicle width direction requires a large force in raising each of the seatbacks arranged on both sides in the vehicle width direction from the forward tilting posture to the upright posture to engage the seatbacks with the vehicle body. Specifically, each seatback is kept in the upright posture by engagement of a catcher provided at an upper side portion of the seatback framework with a striker provided on the vehicle body at a corresponding position. However, a fork section may be displaced from the striker in the raising of the seatback having the forward tilting posture to the upright posture. When the displacement of the fork section from the striker occurs, a large force is required for the engagement with the striker.

The reason why the large force is required in raising the foldable seatback on the one side in the vehicle width direction from the forward tilting posture to engage the seatback with the vehicle body as described lies in torsion of the seatback attributed to an urging force given by a reverse rotation spring provided to a hinge. The reverse rotation spring aims at keeping the seatback having the forward tilting posture in that forward tilting posture.

Specifically, the reverse rotation spring always gives the urging force to the seatback in the direction of the forward tilting posture. In the raising of the seatback on the one side in the vehicle width direction from the forward tilting posture, a side portion of the seatback on the one side that is closer to the center in the vehicle width direction is twisted upward and another side portion thereof on the opposite side to the one side is twisted outwardly in the vehicle width direction. The torsion of the seatback having received the urging force given by the reverse rotation spring results in displacement of the fork section from an appropriate position corresponding to the striker. As a result, a large force is required to engage the seatback with the vehicle body.

The present invention has been achieved to solve the drawbacks described above, and has an object of providing a vehicle seat requiring no large force in raising a foldable seatback arranged on one side in a vehicle width direction from a forward tilting posture to engage the seatback with a vehicle body.

A vehicle seat according to one aspect of the present invention is a vehicle seat to be fixedly attached to a floor panel of a vehicle body. The vehicle seat includes: a first seatback framework arranged on one side in a vehicle width direction and having a posture shiftable between a forward tilting posture and an upright posture; a second seatback framework being adjacent to the first seatback framework at an inner position in the vehicle width direction; an engaged part located on the one side of the first seatback framework in the vehicle width direction and engageable with an engaging part provided on the vehicle body; a first hinge located at a boundary between the first seatback framework and the second seatback framework in the vehicle width direction or located near to the boundary, and having a first fixed part to be fixedly attached to the floor panel and a first movable part connected to a lower portion of the first seatback framework and being rotatable about the first fixed part; a second hinge being adjacent to the first hinge at an inner position in the vehicle width direction, and having a second fixed part to be fixedly attached to the floor panel and a second movable part connected to a lower portion of the second seatback framework and being rotatable about the second fixed part; an urging member attached to the first hinge to give the first seatback framework an urging force of shifting the posture of the first seatback framework from the upright posture to the forward tilting posture; and a joining part joining the first fixed part of the first hinge and the second fixed part of the second hinge at a higher position than a fixed position of the first hinge to the floor panel and a fixed position of the second hinge to the floor panel.

DESCRIPTION OF EMBODIMENTS

Hereinafter, an embodiment of the present invention will be described with reference to the accompanying drawings. It should be noted that the following embodiment illustrates one specific example of the present invention, and the present invention is not delimited to the embodiment except its essential configuration.

Moreover, in the drawings used for the following description, the sign "FR" denotes a front direction or front side of a vehicle body in which the vehicle seat is mounted, the sign "RE" denotes a rear direction or rear side thereof, the sign "LO" denotes a lower direction or lower side thereof, the sign "LE" denotes a left direction or left side thereof, and the sign "RI" denotes a right direction or right side thereof.

EMBODIMENT

1. Configuration of a Vehicle Seat 1

Figure 1:
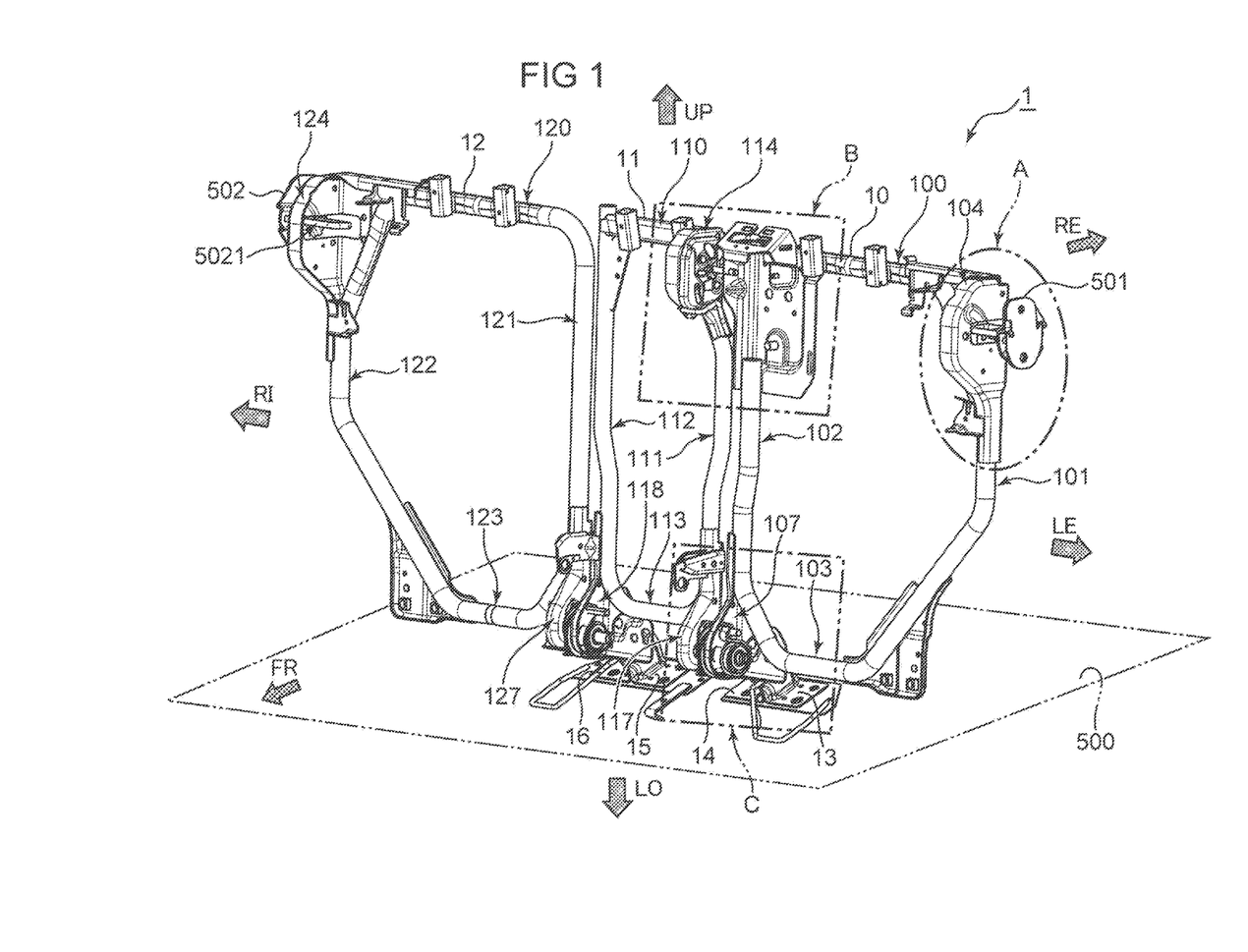
FIG. 1 is a perspective view of seatback frameworks and hinges extracted from a configuration of a vehicle seat according to an embodiment.

A configuration of a vehicle seat 1 according to an embodiment will be described with reference to FIGS. 1 to FIG. 3. FIG. 1 omits illustration of a seat cushion for allowing an occupant to sit thereon, a cushion pad for a seatback, a headrest, and other components in the configuration of the vehicle seat 1.

First, the vehicle seat 1 according to the embodiment is adopted for a rear seat of an automobile as an example.

As shown in FIG. 1, the vehicle seat 1 according to the embodiment includes a left seatback framework 10, a center seatback framework 11, and a right seatback framework 12. The left seatback framework 10 is located on a left side in a vehicle width direction. The right seatback framework 12 is located on a right side in the vehicle width direction. The center seatback framework 11 is arranged between the left seatback framework 10 and the right seatback framework 12 in adjacent to both the left seatback framework 10 and the right seatback framework 12.

In the embodiment, the left seatback framework 10 corresponds to a "first seatback framework", and the center seatback framework 11 corresponds to a "second seatback framework".

The left seatback framework 10 is a frame member having a substantially rectangular external shape in a front view, and has an upper frame 100, side frames 101, 102, and a lower frame 103. A bracket 107 is provided around a corner extending from a lower portion of the side frame 102 to the lower frame 103.

Figure 2:
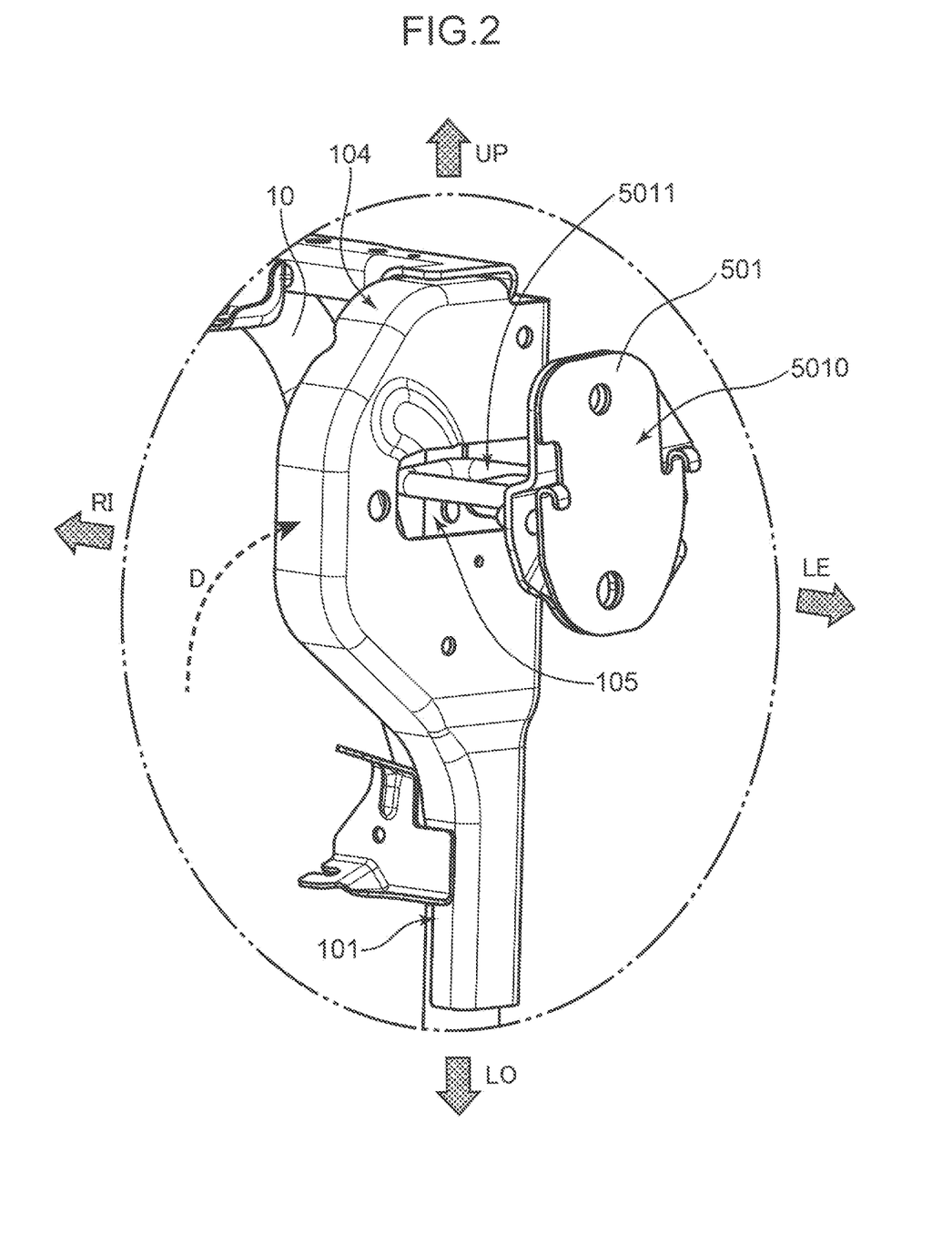
FIG. 2 is an enlarged perspective view of a region A shown in FIG. 1

As shown in FIG. 1 and FIG. 2, the left side frame 101 has a top portion provided with a catcher 104. A fork section 105 is provided to be engaged with a striker 501 fixedly attached to the vehicle body. Specifically, as shown in FIG. 2, the striker 501 has a base 5010 to be fixedly attached to the vehicle body and a bar 5011 protruding from the base 5010 toward the center in the vehicle width direction. The catcher 104 has the fork section 105 to be engaged with the bar 5011 of the striker 501 in the upright posture of the left seatback framework 10 in a direction denoted by arrow D. The engagement of the striker 501 with the catcher 104 keeps the posture of the left seatback framework 10 in the upright posture. The striker 501 corresponds to an "engaging part" and the catcher 104 corresponds to an "engaged part".

Figure 3:
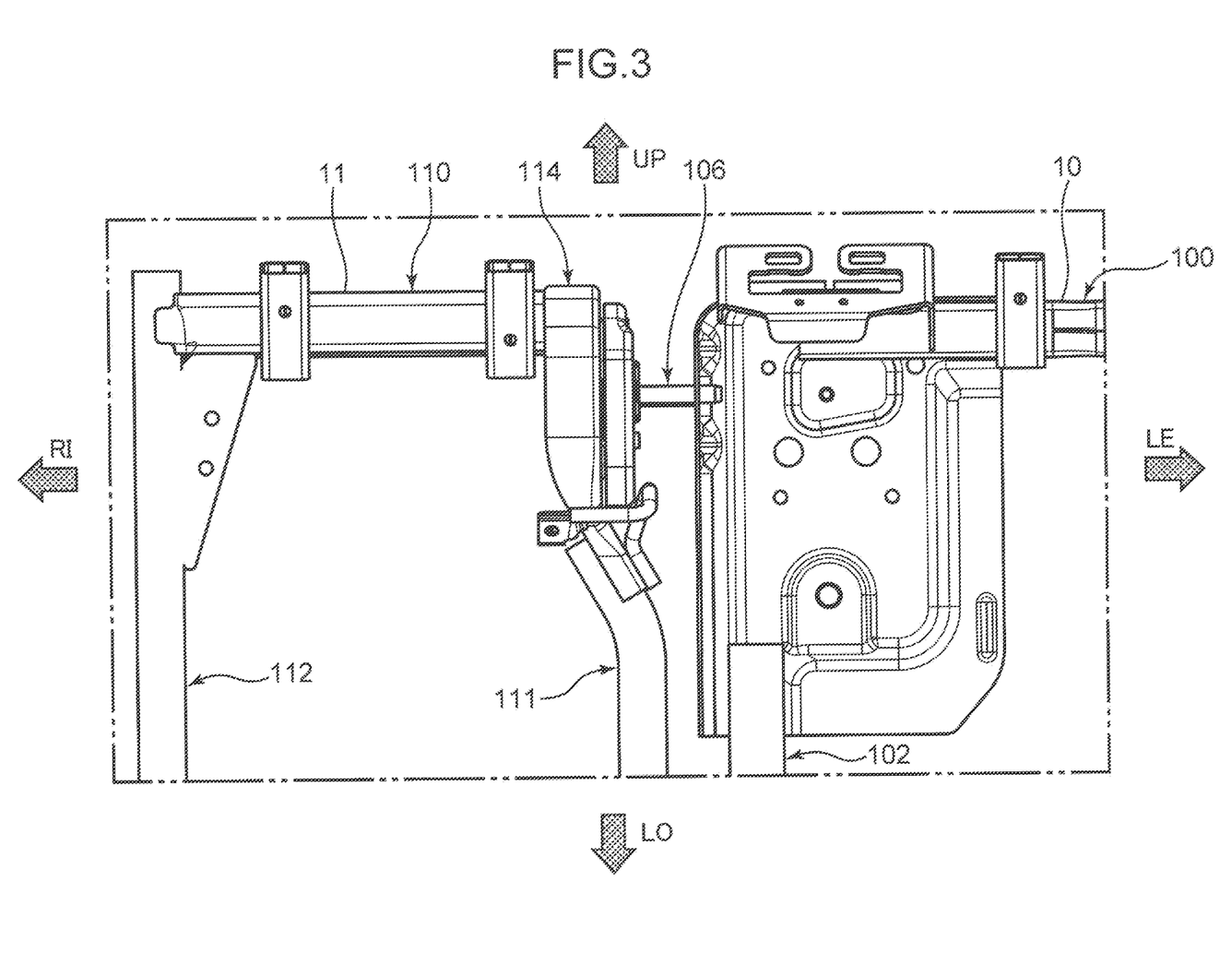
FIG. 3 is an enlarged front view of a region B shown in FIG. 1.

As shown in FIG. 1 and FIG. 3, the right side frame 102 has a top portion provided with a bar 106 extending toward the center. The bar 106 in the left seatback framework 10 is aimed at connection to the center seatback framework 11.

Referring back to FIG. 1, the center seatback framework 11 is also a frame member having a substantially rectangular external shape in the front view, and has an upper frame 110, side frames 111, 112, and a lower frame 113. A bracket 117 is provided around a corner extending from a lower portion of the side frame 111 to the lower frame 113 and a bracket 118 is provided around a corner extending from a lower portion of the side frame 112 to the lower frame 113.

As shown in FIG. 1 and FIG. 3, the left side frame 111 has a top portion provided with a catcher 114. The catcher 114 is engaged with the bar 106 provided on the left seatback framework 10.

Referring back to FIG. 1, the right seatback framework 12 is a frame member having a substantially rectangular external shape in the front view, and has an upper frame 120, side frames 121, 122, and a lower frame 123. A bracket 127 is provided around a corner extending from a lower portion of the side frame 121 to the lower frame 123. The right side frame 122 has a top portion provided with a catcher 124 having the same structure as the catcher 104 of the left seatback framework 10. A fork section (not shown) of the catcher 124 is engageable with a bar 5021 of a striker 502 fixedly attached to the vehicle body. The engagement of the striker 502 with the catcher 124 keeps the posture of the right seatback framework 12 in the upright posture.

The vehicle body has a floor panel 500 to which four hinges 13 to 16 are fixedly attached. The hinge (left outer hinge) 13 located between the left seatback framework 10 and the center seatback framework 11 in the vehicle width direction is connected to the bracket 107 of the left seatback framework 10. The left seatback framework 10 is rotatably supported by the left outer hinge 13, and has a posture shiftable between a forward tilting posture in which the left seatback framework 10 tilts forward and the upright posture thereof shown in FIG. 1. The left outer hinge 13 corresponds to a "first hinge".

The hinge (left inner hinge) 14 being adjacent to the left outer hinge 13 on the right side thereof is connected to the bracket 117 of the center seatback framework 11. The hinge (right inner hinge) 15 spaced rightward from the left inner hinge 14 is connected to the bracket 118 of the center seatback framework 11. The center seatback framework 11 is rotatably supported by the left inner hinge 14 and the right inner hinge 15, and has a posture shiftable between a forward tilting posture in which the center seatback framework 11 tilts forward and an upright posture thereof shown in FIG. 1. The left inner hinge 14 corresponds to a "second hinge".

The hinge (right outer hinge) 16 being adjacent to the right inner hinge 15 on the right side thereof is connected to the bracket 127 of the right seatback framework 12. The right seatback framework 12 is rotatably supported by the right outer hinge 16, and has a posture shiftable between a forward tilting posture in which the right seatback framework 12 tilts forward and the upright posture thereof shown in FIG. 1.

2. Structure of Each of the Hinges 13 to 16

A structure of each of the hinges 13 to 16 will be described with reference to FIG. 4 and FIG. 5. Although FIG. 4 and FIG. 5 illustrate the left outer hinge 13 and the left inner hinge 14, each of the right inner hinge 15 and the right outer hinge 16 has a similar structure.

Figure 4:
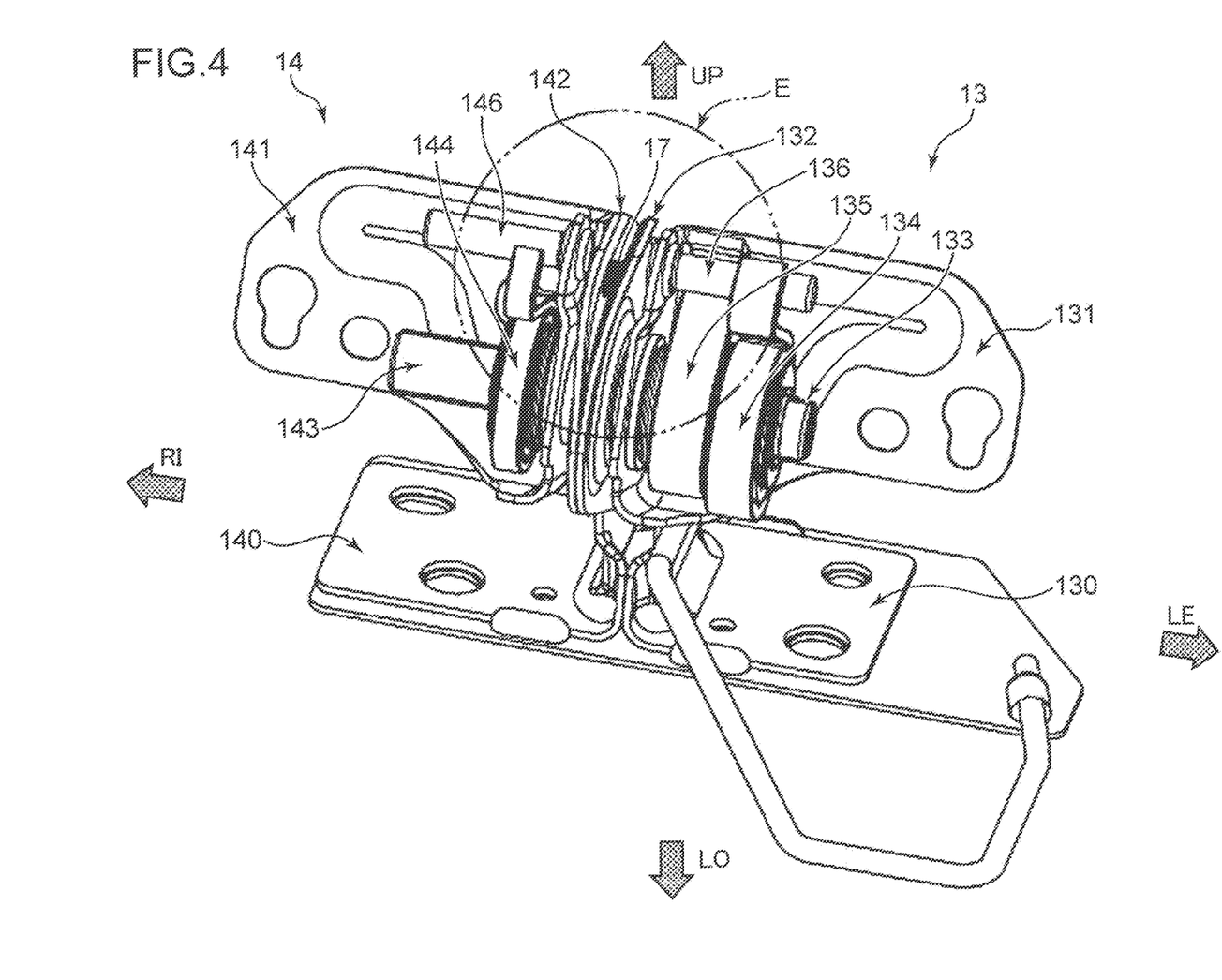
FIG. 4 is an enlarged perspective view of a region C shown in FIG. 1.
Figure 5:
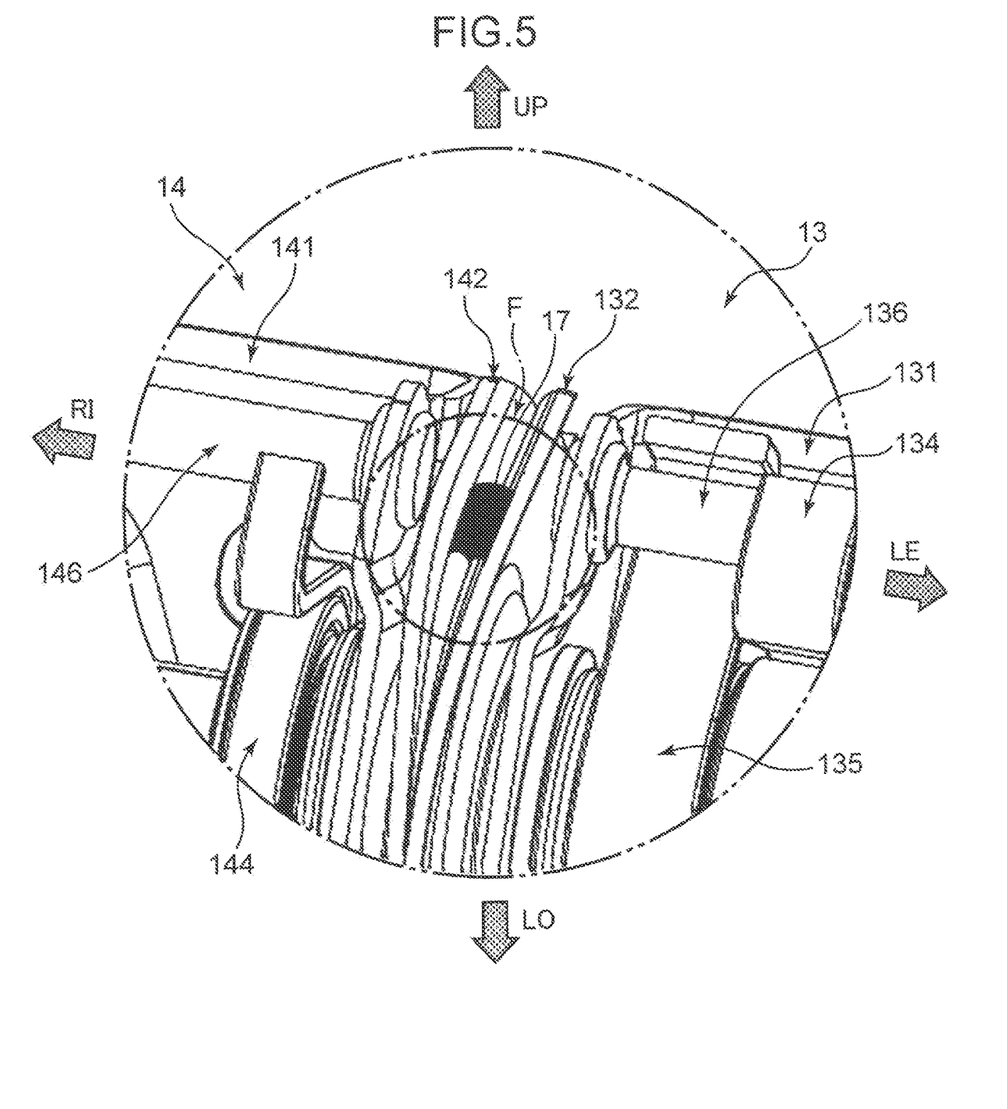
FIG. 5 is an enlarged perspective view of a region E shown in FIG. 4.

As shown in FIG. 4, the left outer hinge 13 has a base bracket 130, a frame bracket 131, a hinge bracket 132, and springs 134, 135. The base bracket 130 has a substantially flat plate shape to be fixedly attached to the floor panel 500. The frame bracket 131 is formed of a metal plate bent into its shape to be connected to the bracket 107 of the left seatback framework 10.

The hinge bracket 132 is continuous to a right end of the base bracket 130 and stands upright from the right end of the base bracket 130. The hinge bracket 132 has a left main surface from which a shaft 133 protrudes leftward. The shaft 133 has a central axis around which the left seatback framework 10 coupled to the frame bracket 131 rotates.

The frame bracket 131 is provided with a pin 136 protruding in parallel to the shaft 133. Each of the springs 134, 135 is wound on the shaft 133 and has a winding end engaged with the pin 136. The spring 134 is a forward rotation spring that is urged in a direction of shifting the posture of the left seatback framework 10 coupled to the frame bracket 131 from the forward tilting posture to the upright posture. By contrast, the spring 135 is a reverse rotation spring that is urged in a direction of shifting the posture of the left seatback framework 10 coupled to the frame bracket 131 from the upright posture to the forward tilting posture.

Here, the base bracket 130 and the hinge bracket 132 correspond to a "first fixed part", and the "frame bracket 131" corresponds to a "first movable part".

The left inner hinge 14 has a base bracket 140, a frame bracket 141, a hinge bracket 142, and a spring 144. The base bracket 140 has a substantially flat plate shape to be fixedly attached to the floor panel 500. The frame bracket 141 is formed of a metal plate bent into its shape to be connected to the bracket 117 of the center seatback framework 11.

The hinge bracket 142 is continuous to a left end of the base bracket 140 and stands upright from the left end of the base bracket 140. The hinge bracket 142 has a right main surface from which a shaft 143 protrudes rightward. The shaft 143 coaxially agrees with the shaft 133, and has a central axis around which the center seatback framework 11 coupled to the frame bracket 141 rotates.

The frame bracket 141 is provided with a pin 146 protruding in parallel to the shaft 143. The spring 144 is wound on the shaft 143 and has a winding end engaged with the pin 146. The spring 144 is a forward rotation spring that is urged in a direction of shifting the posture of the center seatback framework 11 coupled to the frame bracket 141 from the forward tilting posture to the upright posture.

Here, the base bracket 140 and the hinge bracket 142 correspond to a "second fixed part", and the "frame bracket 141" corresponds to a "second movable part".

As shown in FIG. 5, the hinge bracket 132 of the left outer hinge 13 and the hinge bracket 142 of the left inner hinge 14 are joined by a weld part 17 formed around upper ends thereof. In other words, the hinge bracket 132 of the left outer hinge 13 and the hinge bracket 142 of the left inner hinge 14 are joined at a higher position than the floor panel 500. The weld part 17 in the embodiment corresponds to a "joining part".

Here, although unillustrated in detail, the right inner hinge 15 has a structure symmetric to the left inner hinge 14, and the right outer hinge 16 has a structure symmetric to the left outer hinge 13. Besides, a hinge bracket of the right inner hinge 15 and a hinge bracket of the right outer hinge 16 are joined by a weld part 17 in the same manner.

3. Arrangement Position of the Weld Part 17

The arrangement position of the weld part 17 will be described with reference to FIG. 6 and FIG. 7.

Figure 6:
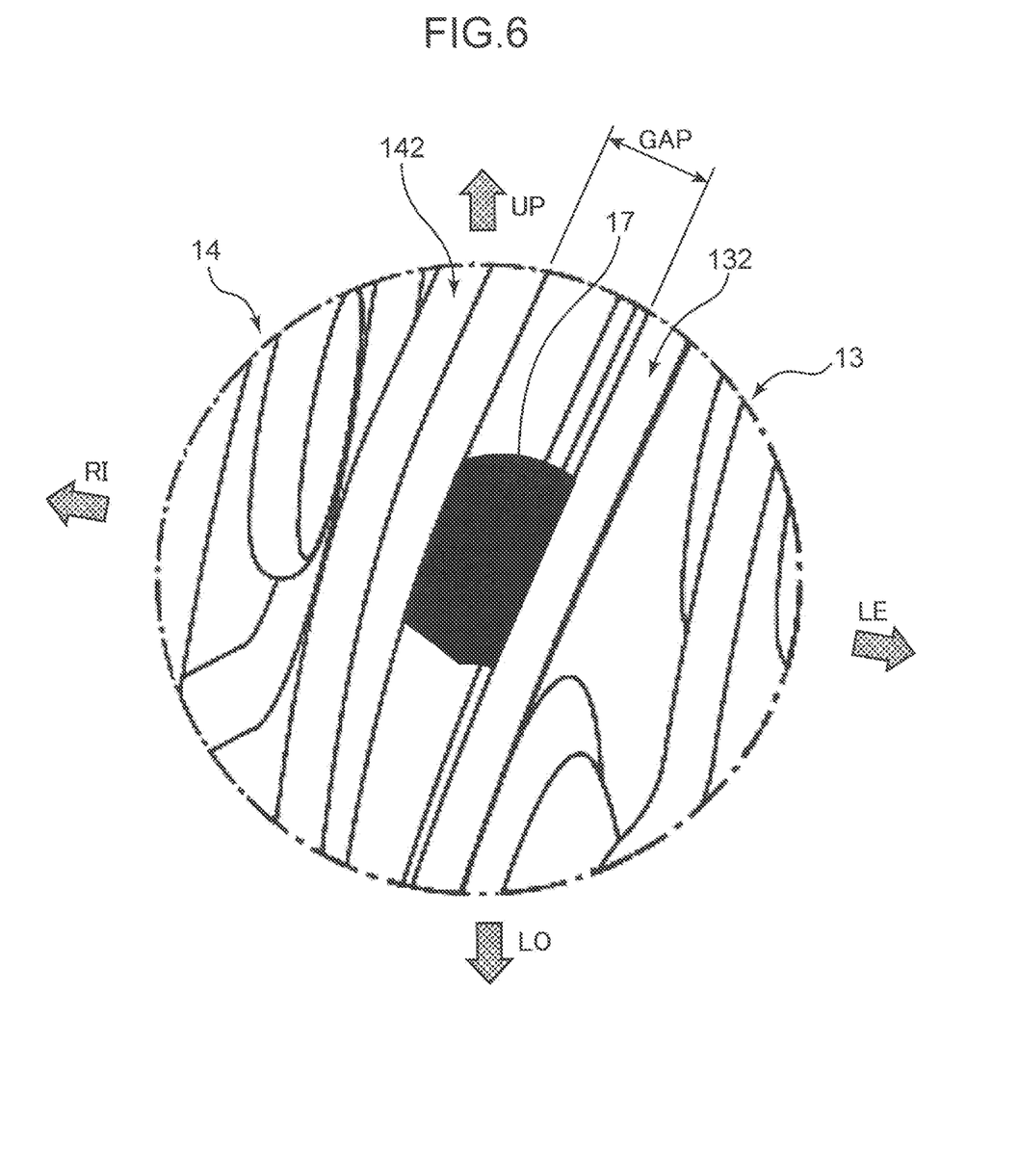
FIG. 6 is an enlarged perspective view of a region F shown in FIG. 5.
Figure 7:
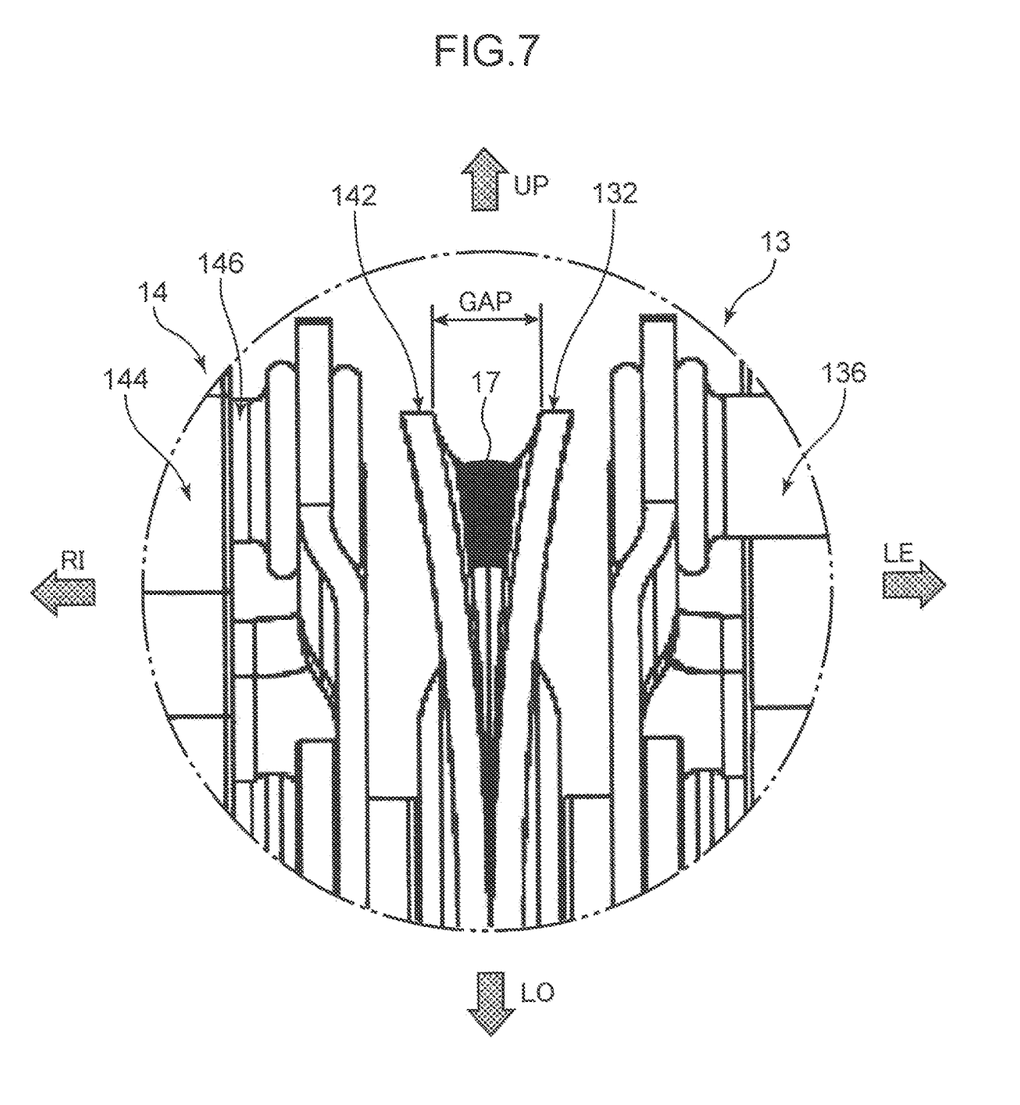
FIG. 7 is an enlarged front view of the region F shown in FIG. 5.

As shown in FIG. 6 and FIG. 7, the weld part 17 is formed to join the upper end of the hinge bracket 132 of the left outer hinge 13 to the upper end of the hinge bracket 142 of the left inner hinge 14 therebetween. As shown in FIG. 7, in a front view of the hinge bracket 132 of the left outer hinge 13 and the hinge bracket 142 of the left inner hinge 14, the hinge bracket 132 of the left outer hinge 13 and the hinge bracket 142 of the left inner hinge 14 define a gap GAP therebetween to have such a shape as to be gradually larger as advancing upward from a lower position.

A work of executing the welding from above has good workability owing to the gap GAP being gradually larger as advancing upward between the hinge bracket 132 of the left outer hinge 13 and the hinge bracket 142 of the left inner hinge 14. This consequently achieves suppression of dispersion of slug and spattering matters between each of the hinge brackets 132, 142 and each of the frame brackets 131, 141, and between each of the shafts 133, 143 and each of the frame brackets 131, 141 at the welding. At the same time, it is possible to execute the welding in a wide area with good workability.

Here, although unillustrated, a weld part formed between the hinge bracket of the right inner hinge 15 and the hinge bracket of the right outer hinge 16 has the same configuration.

4. Effects Resulting from the Arrangement of the Weld Part 17

Figure 8:
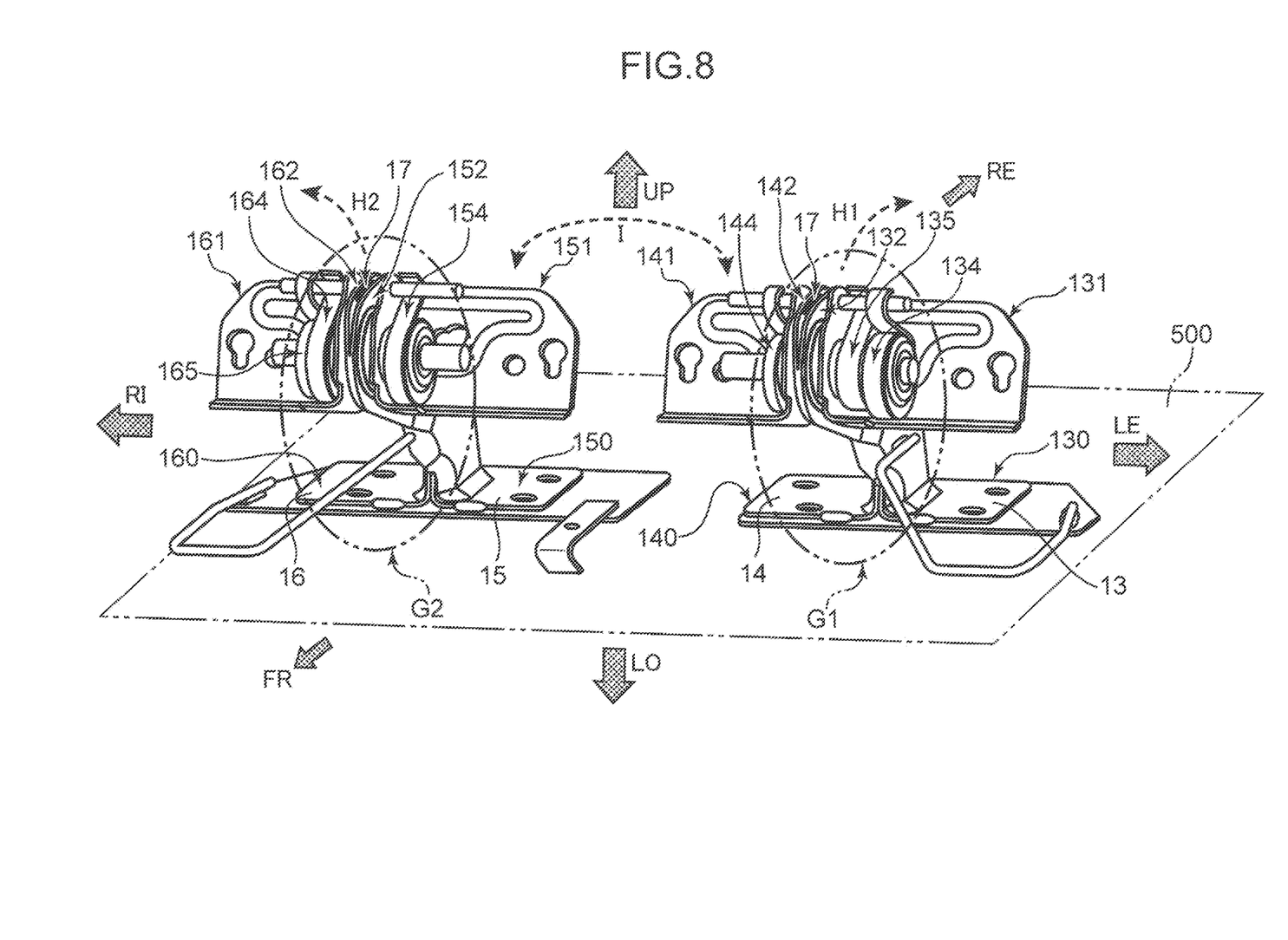
FIG. 8 is a perspective view of four hinges extracted from the configuration of the vehicle seat.
Figure 9:
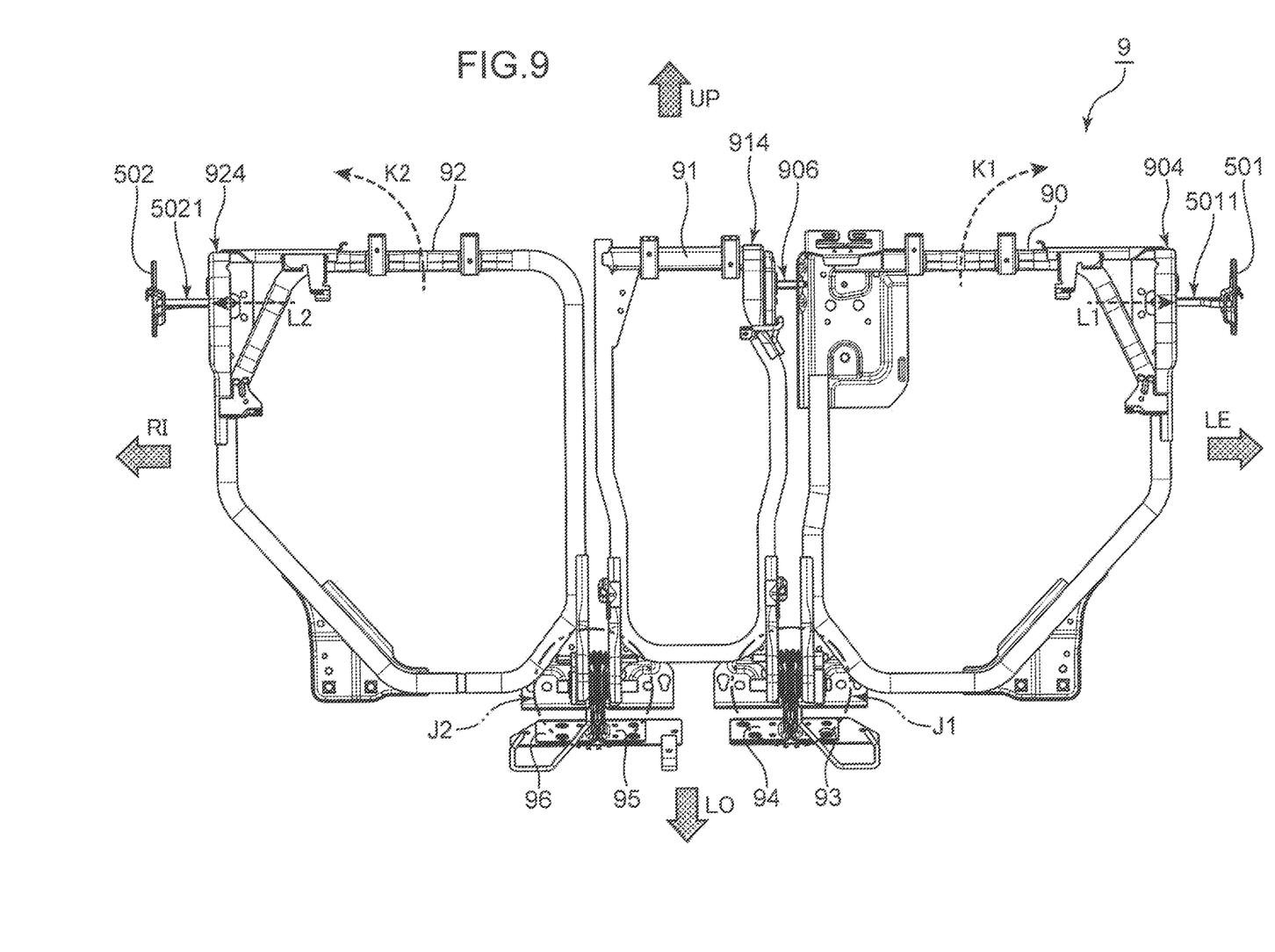
FIG. 9 is a front view of seatback frameworks and hinges extracted from a configuration of a vehicle seat according to a comparative example.

The effects resulting from the arrangement of the weld part 17 to join the hinge bracket 132 of the left outer hinge 13 and the hinge bracket 142 of the left inner hinge 14 will be described with reference to FIG. 8 and FIG. 9. FIG. 8 omits illustration of the seatback frameworks 10 to 12. Moreover, FIG. 9 shows a vehicle seat 9 according to a comparative example. The vehicle seat 9 according to the comparative example differs from the vehicle seat 1 according to the embodiment in that hinge brackets of hinges 93, 94 are not joined to each other and that hinge brackets of hinges 95, 96 are not joined to each other.

First, when a left seatback framework 90 having a forward tilting posture is raised in the comparative example where the hinge brackets of the hinges 93, 94 are not joined to each other and the hinge brackets of the hinges 95, 96 are not joined to each other as shown in FIG. 9, the left seatback framework 90 receives action of a strong urging force given by a reverse rotation spring provided on the hinge 93 (spring provided in a region J1) and is twisted in a direction denoted by each of arrows K1, L1. Hence, a large force is required to engage a catcher 904 of the left seatback framework 90 with a bar 5011 of a striker 501.

Similar torsion occurs in raising the left seatback framework 90 and a center seatback framework 91 in a state where a bar 906 is engaged with a catcher 914 of a center seatback framework 91.

Furthermore, in raising of a right seatback framework 92 from a forward tilting posture, the right seatback framework 92 receives action of a strong urging force given by a reverse rotation spring provided on the hinge 96 (spring provided in a region J2) and is twisted in a direction denoted by each of arrows K2, L2. Hence, a large force is required to engage a catcher 924 of the right seatback framework 92 with a bar 5021 of a striker 502.

By contrast, in the vehicle seat 1 according to the embodiment, the weld part 17 joins the hinge brackets 132, 142 of the hinges 13, 14 being adjacent to each other in the vehicle width direction (in region G1). Thus, the urging force given by the reverse rotation spring 135 is distributed from the hinge bracket 132 to the hinge bracket 142 via the weld part 17 in the raising of the left seatback framework 10 having the forward tilting posture. In this manner, the base bracket 130 of the hinge 13 and the base bracket 140 of the hinge 14 can suppress the torsion of the left seatback framework 10 in a direction denoted by arrow H1 in the raising of the left seatback framework from the forward tilting posture.

Furthermore, the frame bracket 141 of the hinge 14 and a frame bracket 151 of the hinge 15 are connected to each other by the center seatback framework 11. Hence, a part of the urging force given by the reverse rotation spring 135 is distributed to the hinge 15 as denoted by arrow I. This also results in suppressing the torsion of the left seatback framework 10 to be smaller in the raising of the left seatback framework having the forward tilting posture.

Similarly, the weld part 17 joins hinge brackets 152, 162 of the hinges 15, 16 being adjacent to each other in the vehicle width direction (in region G2). Thus, an urging force given by a reverse rotation spring 164 is distributed from the hinge bracket 162 to the hinge bracket 152 via the weld part 17 in the raising of the right seatback framework 12 having the forward tilting posture. In this manner, a base bracket 160 of the hinge 16 and a base bracket 150 of the hinge 15 can suppress the torsion of the right seatback framework 12 in a direction denoted by arrow H2 in the raising of the right seatback framework from the forward tilting posture.

Besides, the frame bracket 151 of the hinge 15 and the frame bracket 141 of the hinge 14 are connected to each other by the center seatback framework 11. Hence, a part of the urging force given by the reverse rotation spring 164 is distributed to the hinge 14 as denoted by arrow I. This also results in suppressing the torsion of the right seatback framework 12 to be smaller in the raising of the right seatback framework from the forward tilting posture.

Moreover, in the vehicle seat 1 according to the embodiment, the hinge bracket 132 and the hinge bracket 142 are joined, and the hinge bracket 152 and the hinge bracket 162 are joined through welding each at a higher position than a corresponding one of the shafts 133, 143. This accordingly achieves effective suppression of torsion of each of the seatback frameworks 10, 12. Specifically, in the raising of the seatback frameworks 10, 12 from the forward tilting posture, torsion would start to occur from the shafts 133, 143 around which the respective seatback frameworks rotate. To avoid such torsion, joining of the associated hinge brackets each at a higher position than the corresponding one of the shafts 133, 143 achieves reliable suppression of torsion starting from the upper portions of the hinges.

As described heretofore, the vehicle seat 1 according to the embodiment requires no large force in raising a seatback (having a configuration including the seatback framework 10 or the seatback framework 12) having the forward tilting posture to engage the catcher 104, 124 with the striker 501, 502.

Modifications

Although the hinge bracket 132 and the hinge bracket 142 are joined to each other and the hinge bracket 152 and the hinge bracket 162 are joined to each to other by the corresponding weld part 17 in the embodiment, a way of joining the hinge brackets is not limited thereto. For instance, a bolt or other fastener is used to join the hinge brackets in a screwing manner.

Although the upper end of the hinge bracket 132 is joined to the upper end of the hinge bracket 142 and the upper end of the hinge bracket 152 is joined to the upper end of the hinge bracket 162 in the embodiment, a joining portion in the present invention is not limited thereto. Middle portions of the hinge brackets in a height direction may be joined to each other. Alternatively, the upper ends may be joined to each other and further the middle portions may be joined to each other.

Moreover, the hinge 13 and the hinge 14 being adjacent to each other may share a single hinge bracket. The hinge 15 and the hinge 16 being adjacent to each other also may share a single bracket.

Although the vehicle seat 1 is configured to include the three seatback frameworks 10 to 12 aligning in the vehicle width direction in the embodiment, the present invention may adopt a vehicle seat configured to include two seatback frameworks juxtaposed in the vehicle width direction.

Although the vehicle seat 1 is applied to the rear seat of the automobile as an example in the embodiment, the vehicle seat is applicable to a front seat in the present invention.

Although a coil spring is adopted for each of the reverse rotation spring 135, 154, 164 in the embodiment, the present invention is not limited thereto. For instance, a plate spring may be used, or an urging member including an elastic member, such as a rubber, may be adopted.

CONCLUSION

A vehicle seat according to one aspect of the present invention is a vehicle seat to be fixedly attached to a floor panel of a vehicle body. The vehicle seat includes: a first seatback framework arranged on one side in a vehicle width direction and having a posture shiftable between a forward tilting posture and an upright posture; a second seatback framework being adjacent to the first seatback framework at an inner position in the vehicle width direction; an engaged part located on the one side of the first seatback framework in the vehicle width direction and engageable with an engaging part provided on the vehicle body; a first hinge located at a boundary between the first seatback framework and the second seatback framework in the vehicle width direction or located near to the boundary, and having a first fixed part to be fixedly attached to the floor panel and a first movable part connected to a lower portion of the first seatback framework and being rotatable about the first fixed part; a second hinge being adjacent to the first hinge at an inner position in the vehicle width direction, and having a second fixed part to be fixedly attached to the floor panel and a second movable part connected to a lower portion of the second seatback framework and being rotatable about the second fixed part; an urging member attached to the first hinge to give the first seatback framework an urging force of shifting the posture of the first seatback framework from the upright posture to the forward tilting posture; and a joining part joining the first fixed part of the first hinge and the second fixed part of the second hinge at a higher position than a fixed position of the first hinge to the floor panel and a fixed position of the second hinge to the floor panel.

The vehicle seat according to the aspect includes the joining part joining the first fixed part of the first hinge and the second fixed part of the second hinge at a higher position than the fixed position of the first hinge to the floor panel and the fixed position of the second hinge to the floor panel, i.e., at each position different from the corresponding fixed position to the floor panel. This enables distribution of the urging force given by the urging member to the second in raising the seatback including the first seatback framework from the forward tilting posture to engage the seatback with the vehicle body. Therefore, the vehicle seat according to the aspect achieves suppression of torsion of the first seatback framework in the raising of the seatback including the first seatback framework, and thus requires no large force to engage the engaged part with the engaging part.

In addition, in the vehicle seat according to the aspect, joining the first fixed part of the first hinge to the second fixed part of the second hinge enables distribution of the urging force given by the urging member from the first hinge to the second hinge. Accordingly, it is possible to suppress deflection at the fixed position of the first hinge to the floor panel to be smaller.

In the vehicle seat according to the aspect, the first hinge may have a first base bracket to be fixedly attached to the floor panel in contact with the floor panel, and a first hinge bracket being continuous to the first base bracket and standing from an end of the first base bracket. The second hinge may have a second base bracket to be fixedly attached to the floor panel in contact with the floor panel, and a second hinge bracket being continuous to the second base bracket and standing from an end of the second base bracket. The first fixed part may include the first hinge bracket and the second fixed part may include the second hinge bracket.

The specific configuration where the joining part joins the first hinge bracket serving as the first fixed part and the second hinge bracket serving as the second fixed part as described above enables distribution of the urging force given by the urging member to the second hinge bracket in the raising of the seatback including the first seatback framework from the forward tilting posture. This archives suppression of torsion of the first seatback framework in the raising of the seatback including the first seatback framework from the forward tilting posture.

In the vehicle seat according to the aspect, the first hinge may further have a shaft having a proximal end connected to the first hinge bracket and having a central axis around which the first seatback framework rotates. The joining part may be at a higher position than the proximal end of the shaft in the first hinge bracket.

The arrangement of the joining part at the higher position than the proximal end of the shaft in the first hinge bracket as described above succeeds in distributing the urging force to the second hinge at the higher position than the center of the rotation of the first seatback framework in the raising of the seatback including the first seatback framework from the forward tilting posture. Adoption of this configuration accordingly leads to achievement in suppression of torsion of the first seatback framework in the raising of the seatback including the first seatback framework from the forward tilting posture. As a result, no large force is required for the engagement.

In the vehicle seat according to the aspect, the first hinge may further have a frame bracket rotatable about the shaft and coupled to the first seatback framework. The urging member may include a coil spring wound on the shaft and having an active point on the frame bracket.

Use of the coil spring wound on the shaft as a specific example of the urging member in the arrangement of the joining part at the higher position than the shaft on which the coil spring wound in the above-described manner enables effective distribution of the urging force given by the coil spring to the second hinge. Adoption of this configuration accordingly leads to achievement in suppression of torsion of the first seatback framework in the raising of the seatback including the first seatback framework from the forward tilting posture. As a result, no large force is required for the engagement.

In the vehicle seat according to the aspect, the joining part may join an upper end of the first hinge bracket to an upper end of the second hinge bracket.

The arrangement of the joining part to join the upper end of the first hinge bracket to the upper end of the second hinge bracket attains the longest distance from the shaft to the joining part in a radial direction of the rotation of the first seatback framework. This enables effective distribution of the urging force given by the coil spring to the second hinge without necessity of increasing the joining strength between the first hinge bracket and the second hinge bracket via the joining part. Adoption of this configuration accordingly leads to achievement in suppression of torsion of the first seatback framework in the raising of the seatback including the first seatback framework from the forward tilting posture. As a result, no large force is required for the engagement.

In the vehicle seat according to the aspect, the first hinge bracket and the second hinge bracket may be arranged to define a larger gap between the upper ends of the first hinge bracket and the second hinge bracket than that between lower portions of the first hinge bracket and the second hinge bracket. The joining part may have a weld part welding the upper ends of the first hinge bracket and the second hinge bracket.

The configuration where the joining part has the weld part, and the gap between the first hinge bracket and the second hinge bracket has such a shape as to be larger between the upper ends of the brackets than between the lower portions thereof succeeds in providing good workability at the welding. Specifically, a work of welding the first hinge bracket and the second hinge bracket to each other from above has good workability. This consequently achieves suppression of dispersion of the slug and spattering matters to the center of the rotation of the first seatback framework at the welding. At the same time, it is possible to execute the welding in a wide area with good workability.

Conclusively, a vehicle seat according to each of the aspects requires no large force in raising a foldable seatback arranged on one side in a vehicle width direction from a forward tilting posture to engage the seatback with a vehicle body.

The invention claimed is:

1. A vehicle seat to be fixedly attached to a floor panel of a vehicle body, comprising:
    a first seatback framework arranged on one side in a vehicle width direction and having a posture shiftable between a forward tilting posture and an upright posture;
    a second seatback framework being adjacent to the first seatback framework at an inner position in the vehicle width direction;
    an engaged part located on the one side of the first seatback framework in the vehicle width direction and engageable with an engaging part provided on the vehicle body;
    a first hinge located at a boundary between the first seatback framework and the second seatback framework in the vehicle width direction or located near to the boundary, and having a first base bracket to be fixedly attached to the floor panel of the vehicle body in contact with the floor panel, a first hinge bracket being continuous to the first base bracket and standing from an end of the first base bracket, and a first movable part connected to a lower portion of the first seatback framework and being rotatable about the first hinge bracket;

a second hinge being adjacent to the first hinge at an inner position in the vehicle width direction, and having a second base bracket to be fixedly attached to the floor panel in contact with the floor panel, a second hinge bracket being continuous to the second base bracket and standing from an end of the second base bracket, and a second movable part connected to a lower portion of the second seatback framework and being rotatable about the second hinge bracket;

an urging member attached to the first hinge to give the first seatback framework an urging force of shifting the posture of the first seatback framework from the upright posture to the forward tilting posture; and a joining part joining an upper end of the first hinge bracket of the first hinge and an upper end of the second hinge bracket of the second hinge at a higher position than a fixed position of the first hinge to the floor panel and a fixed position of the second hinge to the floor panel, wherein the joining part has a weld part welding the upper end of the first hinge bracket and the upper end of the second hinge bracket together.

2. The vehicle seat according to claim 1, wherein the first hinge further has a shaft having a proximal end connected to the first hinge bracket and having a central axis around which the first seatback framework rotates, and the joining part is at a higher position than the proximal end of the shaft in the first hinge bracket.

3. The vehicle seat according to claim 2, wherein the first hinge further has a frame bracket rotatable about the shaft and coupled to the first seatback framework, and the urging member includes a coil spring wound on the shaft and having an active point on the frame bracket.

4. The vehicle seat according to claim 1, wherein the first hinge bracket and the second hinge bracket are arranged to define a larger gap between the upper ends of the first hinge bracket and the second hinge bracket than that between lower portions of the first hinge bracket and the second hinge bracket.

* * * * *